US008922847B2

(12) United States Patent
Nakahata

(10) Patent No.: US 8,922,847 B2
(45) Date of Patent: Dec. 30, 2014

(54) IMAGE FORMING APPARATUS INCLUDING MULTI-BEAM OPTICAL SCANNING APPARATUS

(71) Applicant: Canon Kabushiki Kaisha, Tokyo (JP)

(72) Inventor: Hiroshi Nakahata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/862,164

(22) Filed: Apr. 12, 2013

(65) Prior Publication Data

US 2013/0286144 A1 Oct. 31, 2013

(30) Foreign Application Priority Data

Apr. 25, 2012 (JP) ................................ 2012-100349
Apr. 2, 2013 (JP) ................................ 2013-077264

(51) Int. Cl.
*H04N 1/04* (2006.01)
*G03G 15/041* (2006.01)

(52) U.S. Cl.
CPC .................................. *G03G 15/0415* (2013.01)
USPC ............ 358/474; 358/475; 358/509; 347/244

(58) Field of Classification Search
CPC .......... G03G 15/011; G03G 15/04045; G03G 15/04054; G03G 15/0415; G03G 15/28; G03G 15/326; G03G 2215/0404; G03G 2221/1636; H04N 1/113; H04N 1/00986; H04N 1/02815; H04N 1/191; G06K 15/1219
USPC ........... 358/474, 475, 509, 501, 1.9; 347/244, 347/258
See application file for complete search history.

(56) References Cited

U.S. PATENT DOCUMENTS 4,951,065 A * 8/1990 Okino .......................... 347/250
4,975,580 A * 12/1990 Ohgoda et al. ................ 250/589
4,996,540 A * 2/1991 Motoi et al. .................. 347/260
5,715,078 A * 2/1998 Shiraishi .................... 359/204.1
5,818,586 A * 10/1998 Lehto et al. .................. 356/454
5,838,479 A * 11/1998 Shiraishi .................... 359/204.1
5,856,669 A * 1/1999 Nagasaka et al. ............. 250/235
6,034,806 A * 3/2000 Inagaki et al. ............. 359/204.1
6,833,940 B2 * 12/2004 Suzuki et al. .............. 359/204.1

(Continued)

FOREIGN PATENT DOCUMENTS

JP 2002-273931 9/2002

OTHER PUBLICATIONS

U.S. Appl. No. 13/860,383, filed Apr. 10, 2013.
U.S. Appl. No. 13/866,792, filed Apr. 19, 2013.

*Primary Examiner* — Negussie Worku
(74) *Attorney, Agent, or Firm* — Fitzpatrick, Cella, Harper & Scinto

(57) ABSTRACT

A plurality of light beams are simultaneously scanned on a surface of a photosensitive member. The surface of the photosensitive member has a curvature factor, and therefore, the light beams have different optical path lengths. Due to differences in the optical path length, a length (scanning width) of a scanning line of one light beam is different from that of another light beam. When a temperature of an optical scanning apparatus increases, the optical path length differences vary, so that differences in magnification between the beams also vary. Therefore, by obtaining correction amounts for the scanning widths depending on the temperature, the light beams are allowed to have substantially the same scanning width even when the temperature of the optical scanning apparatus varies.

17 Claims, 10 Drawing Sheets

(56) References Cited

U.S. PATENT DOCUMENTS

| | | | | |
|---|---|---|---|---|
| 6,999,208 | B2 * | 2/2006 | Suzuki et al. | 358/474 |
| 7,072,087 | B2 | 7/2006 | Nakahata | 359/204 |
| 7,098,938 | B2 * | 8/2006 | Yoshida | 347/244 |
| 7,158,165 | B2 * | 1/2007 | Kato | 347/244 |
| 7,161,724 | B1 * | 1/2007 | Miyatake | 359/204.1 |
| 7,245,410 | B2 * | 7/2007 | Miyatake | 359/204.1 |
| 7,298,390 | B2 | 11/2007 | Nakahata | 347/231 |
| 7,542,191 | B2 * | 6/2009 | Kadowaki | 359/214.1 |
| 7,629,992 | B2 | 12/2009 | Nakahata | 347/243 |
| 7,728,861 | B2 | 6/2010 | Nakahata | 347/231 |
| 7,742,214 | B2 * | 6/2010 | Abe | 359/213.1 |
| 7,798,593 | B2 * | 9/2010 | Nitta et al. | 347/17 |
| 7,830,576 | B2 | 11/2010 | Nakahata | 359/201.1 |
| 8,559,087 | B2 * | 10/2013 | Mori et al. | 359/204.1 |
| 8,791,975 | B2 * | 7/2014 | Yamazaki et al. | 347/263 |
| 2010/0104304 | A1 * | 4/2010 | Ito et al. | 399/51 |
| 2012/0081770 | A1 | 4/2012 | Sato et al. | 359/204.1 |

* cited by examiner

IMAGE FORMING APPARATUS INCLUDING MULTI-BEAM OPTICAL SCANNING APPARATUS

BACKGROUND OF THE INVENTION

1. Field of the Invention

The present invention relates to image forming apparatuses including a multi-beam optical scanning apparatus.

2. Description of the Related Art

Electrophotographic image forming apparatuses typically form an electro latent image on an image carrier by irradiation with a light beam emitted from an optical scanning apparatus. A tandem image forming apparatus that forms a multi-color image includes a plurality of stations. The stations each include an image carrier. The stations individually form an electro latent image, and develop the electro latent images using toners having different colors to form toner images. The toner images having different colors are transferred, one on top of another, to a recording material or an intermediate transfer member. If the positions of the transferred toner images having different colors are misaligned, a color misalignment may occur that can be recognized by the naked eye.

A color misalignment also occurs at an end portion of an image in the main scanning direction if scanning lines have different lengths (magnifications) in the main scanning direction in each of the stations. Differences in the scanning line magnification between the stations may be caused by differences in temperature between the stations. Japanese Patent Laid-Open No. 2002-273931 proposes a technique of detecting the temperature of the optical scanning apparatus using a temperature sensor, and correcting the frequency of the image clock based on the detected temperature, in each of the stations. The document states that this technique reduces the differences in the magnification between the stations that are caused by the differences in temperature between the stations.

Japanese Patent Laid-Open No. 2002-273931 is directed to an image forming apparatus in which a single light beam is used for each color. In recent years, however, an optical scanning apparatus has been proposed in which one or more scanning lines are drawn by simultaneously outputting a plurality of light beams. Such an optical scanning apparatus is called a multi-beam optical scanning apparatus. In the multi-beam optical scanning apparatus, not only differences in the magnification between the stations (inter-station magnification differences), but also differences in the magnification between the light beams in the same station (inter-beam magnification differences), cause a problem. In other words, even if correction data for correcting the differences in the magnification between the stations is available, image moire cannot be reduced by only applying the correction data directly to the light beams.

In the multi-beam optical scanning apparatus, a drum-shaped image carrier is simultaneously irradiated with a plurality of light beams at separate positions in the sub-scanning direction. The image carrier has a circular cross-section, and therefore, the surface (circumferential surface) of the image carrier has a curvature factor. The optical paths of the light beams have lengths that vary depending on the curvature factor. Therefore, a difference in the magnification depending on the curvature factor occurs between the light beams. In other words, even for the same image data, scanning lines drawn by the light beams have different lengths (scan lengths).

The magnification differences between the light beams cause image moire due to a correspondence relationship with a screen process used in an image process. If a process of drawing a plurality of scanning lines using a plurality of light beams per scan is performed a plurality of times, a scanning line misalignment occurs periodically. If the periodic scanning line misalignments interfere with the screen process for binarization, image moire occurs. If the magnification of each of the light beams can be detected in real time, the magnification difference between the light beams can be corrected. To date, however, a pattern or sensor for performing such real-time detection has not been provided. In other words, only patterns and sensors for detecting relative magnifications between the stations have been previously proposed. Therefore, in order to reduce image moire, it is necessary to provide any technique of correcting the magnification, depending on the temperature, for each of a plurality of light beams in the same station.

SUMMARY OF THE INVENTION

It is a feature of the present invention to correct a scanning width of each of at least one of the light beams based on the temperature in an image forming apparatus in which an electro latent image is formed on a photosensitive member by scanning a plurality of light beams on the photosensitive member, and the electro latent image is developed using a toner, whereby an image is formed.

An embodiment of the present invention provides an image forming apparatus comprising an optical scanning apparatus and a correction unit. The optical scanning apparatus may include the following elements. A light source includes a plurality of light emitting elements each configured to output, based on input image data, a light beam for irradiation of a photosensitive member driven to rotate. The plurality of light emitting elements are arranged so that the photosensitive member is irradiated at different positions in a rotational direction with a plurality of the light beams output from the plurality of light emitting elements. A deflection unit is provided in the optical scanning apparatus and is configured to deflect the plurality of light beams output from the plurality of light emitting elements so that the plurality of light beams scan on the photosensitive member. A lens is provided in the optical scanning apparatus and is configured to guide the plurality of light beams deflected by the deflection unit to the photosensitive member. A temperature detecting unit is configured to detect an internal temperature of the optical scanning apparatus. The correction unit is configured to correct a scanning width of at least one of the plurality of light beams emitted from the plurality of light emitting elements based on the input image data, based on a result of the detection by the temperature detecting unit, so that the plurality of light beams output from the plurality of light emitting elements based on the input image data have the same scanning width in a scanning direction in which the plurality of light beams scan on the photosensitive member.

Further features of the present invention will become apparent from the following description of exemplary embodiments (with reference to the attached drawings).

DESCRIPTION OF THE EMBODIMENTS

Figure 1:
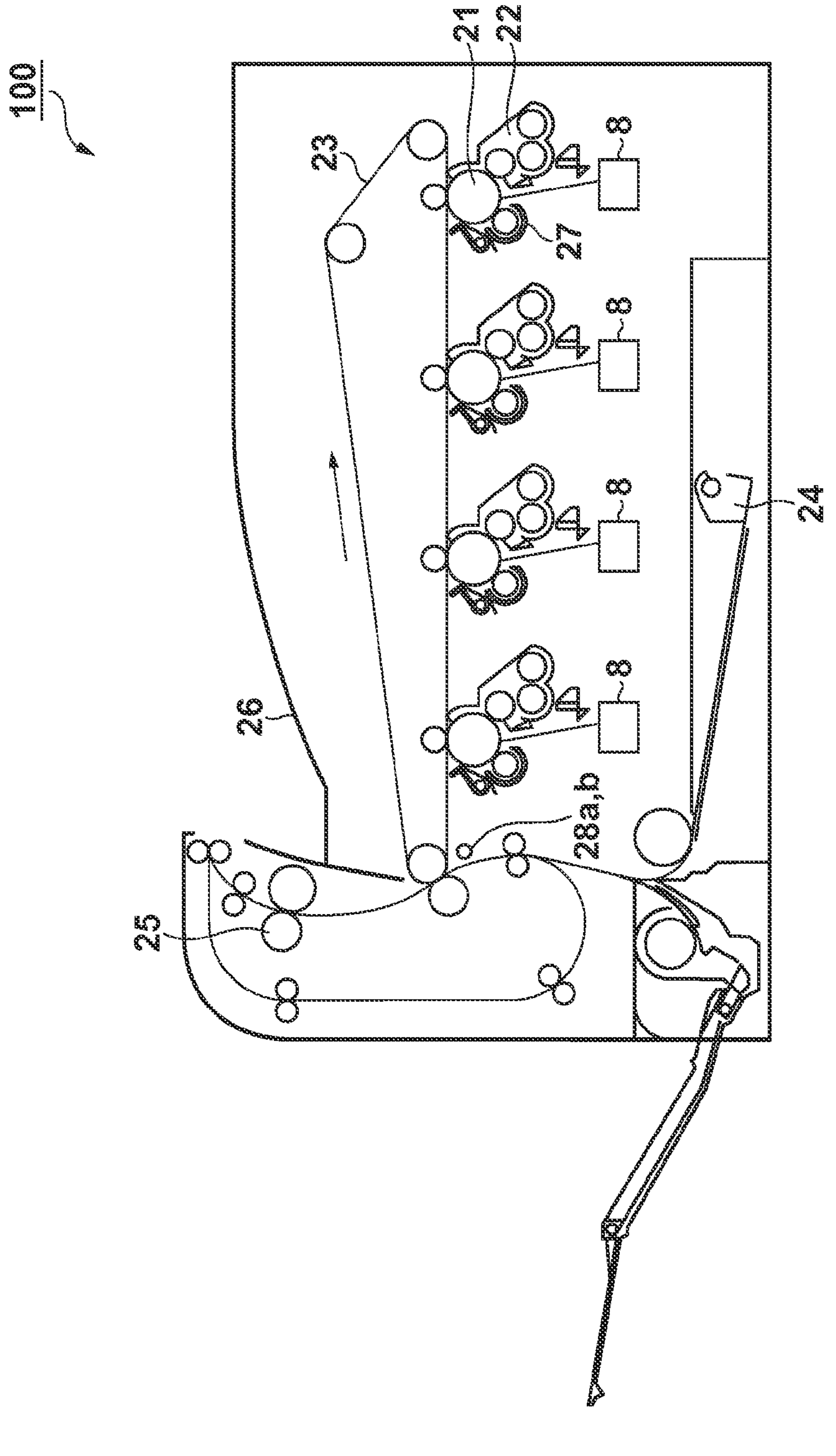
FIG. 1 is a cross-sectional view schematically showing an image forming apparatus that forms a multi-color image.

In FIG. 1, an image forming apparatus 100 forms a multi-color image using toners of yellow (Y), magenta (M), cyan (C), and black (K). In FIG. 1, four stations are arranged in the order of Y, M, C, and K from the left. The stations have the same or similar configuration, and therefore, here, the black station will be described.

The optical scanning apparatus 8 scans a plurality of light beams on a photosensitive drum (photosensitive member) 21 described below. The optical scanning apparatus 8 includes a multi-beam laser as a light source that irradiates the photosensitive drum 21 with light beams based on input image data. The optical scanning apparatus 8 of this example outputs a plurality of light beams to draw a plurality of scanning lines on the photosensitive drum 21 during one scanning period. Note that the optical scanning apparatus 8 includes a plurality of light emitting elements that are arranged so that different positions in a rotation direction of the photosensitive member are exposed to a plurality of light beams output from the light emitting elements. Here, a direction in that a light beam is scanned on the photosensitive drum 21 is referred to as a "main scanning direction," and a direction perpendicular to the main scanning direction (i.e., a direction in which the photosensitive drum 21 is driven and rotated) is referred to as a "sub-scanning direction." Different positions in the sub-scanning direction are exposed to the respective light beams output from the multi-beam laser.

The photosensitive drum 21 holds an electro latent image and a toner image. A charger 27 uniformly charges a surface (circumferential surface) of the photosensitive drum 21. Thereafter, the photosensitive drum 21 is exposed to light beams so that an electro latent image is formed on the photosensitive drum 21. A developer 22 develops the electro latent image formed on the photosensitive drum 21 using a toner to form a toner image. The toner image is transferred to an intermediate transfer belt 23 that functions as an intermediate transfer member (first transfer). The toner images of Y, M, C, and K are transferred, one on top of another, to the intermediate transfer belt 23, resulting in a multi-color toner image. The multi-color toner image is transferred to a transfer sheet S accommodated in a paper feed cassette 24 (second transfer). A fixer 25 fixes the multi-color toner image to the transfer sheet S, which is in turn discharged to a paper discharge tray 26. Pattern sensors 28*a* and 28*b* read patterns of Y, M, C, and K formed on the intermediate transfer belt 23. The patterns are a toner image that is used to measure relative magnitudes of color misalignments between Y, M, C, and K.

The optical scanning apparatus 8 employing a multi-beam laser is required to form a satisfactory image with less color misalignment and less image moire. Therefore, in this example, not only a difference in the magnification between the stations (inter-station magnification difference/inter-station scanning width difference), but also a difference in the magnification between the light beams in the same station (inter-beam magnification difference/inter-beam scanning width difference), are reduced. Note that the magnification in the main scanning direction of an image refers to a width in the main scanning direction of the image. The magnification in the sub-scanning direction of an image refers to a width in the sub-scanning direction of the image. The width in the main scanning direction of an image is substantially equal to the scanning width of a light beam that is output from the light source based on input image data.

<Inter-Station Magnification Difference>

Figure 2:
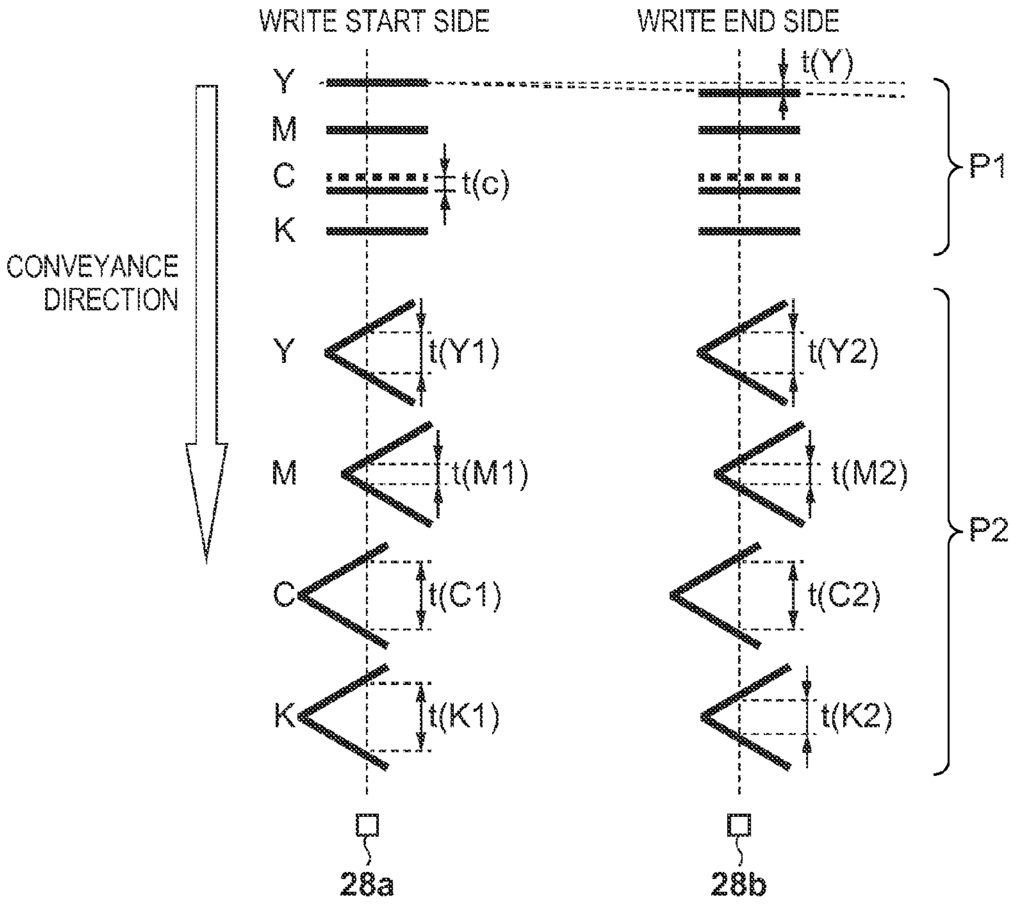
FIG. 2 is a diagram showing patterns for correcting a color misalignment caused by an inter-station magnification difference.

As shown in FIG. 2, the pattern sensors 28*a* and 28*b* that read a pattern for correcting a color misalignment occurring due to the inter-station magnification difference (scanning width difference) are provided at two points in the main scanning direction. In FIG. 2, dashed lines extending in the conveyance direction (sub-scanning direction) indicate detection positions (read positions) of the pattern sensors 28*a* and 28*b*.

The image forming apparatus 100 forms, on the intermediate transfer belt 23, patterns P1 for detecting a position misalignment in the sub-scanning direction. The image forming apparatus 100 detects a time difference t(Y) between timings at which patterns are detected by the two pattern sensors 28*a* and 28*b*. The product of t(Y) and the conveyance speed is a difference in distance.

The image forming apparatus 100 also detects a period of time corresponding to an irradiation position misalignment of each of Y, M, and C with reference to K based on the detection results of the two pattern sensors 28*a* and 28*b*. In FIG. 2, an ideal position of C with reference to K is indicated by a horizontal dashed line. Therefore, a distance between the dashed line and the solid line corresponds to an irradiation position misalignment. The irradiation position misalignment for C is obtained as a period of time t(C).

The magnitude of a position misalignment in the main scanning direction is obtained by forming a dogleg or L-shaped pattern P2 ("<") on opposite edges of the intermediate transfer belt 23, and detecting the patterns P2 using the respective pattern sensors 28*a* and 28*b*. The pattern sensors 28*a* and 28*b* each detect the lower sides (backslash-shaped portions) and upper sides (slash-shaped portions) of the "<"-shaped patterns P2, and calculate time differences t(Y1) to t(K1) and t(Y2) to t(K2), respectively. An angle between the lower side (backslash-shaped portion) of the "<"-shaped pattern P2 and the conveyance direction is represented by θ. The magnitudes of position misalignments in the main scanning direction are calculated by multiplying t(Y1) to t(K1) and t(Y2) to t(K2) by tan θ.

The magnification in the main scanning direction, and a write start position and a write end position, will be described. If there is not a difference between the ideal passage time and the actual passage time and there is not a difference between the passage times on the left and right sides, the actual magnification and write start position of each of Y, M, C, and K are equal to those designed. For example, if t(Y1)=t(Y2)=the designed value for yellow, the actual magnification and write start position of Y are equal to those designed. On the other hand, for magenta, the passage time t(M1) of the pattern on the write start side is smaller than the designed value, and the passage time t(M2) of the pattern on the write end side is also smaller than the designed value. Therefore, it is determined that the image of Y is shifted rightward. For cyan, the passage time t(C1) on the write start side is greater than the designed value, and the passage time t(C2) on the write end side is also greater than the designed value, and therefore, it is determined that the image of C is shifted leftward. For black, the passage time t(K1) on the write start side is greater than the designed value, and the passage time t(K2) on the write end side is smaller than the designed value, and therefore, it is determined that the scanning line of black expands in opposite directions, so that the magnification of the image increases.

The image forming apparatus 100 corrects image write timing or image clock using the patterns P1 and P2 so that the write start position in the main scanning direction, the write start position in the sub-scanning direction, and the magnification in the main scanning direction of each non-reference color match those of a specific reference color (black etc.). As a result, a color misalignment between each station is reduced.

<Inter-beam Magnification Difference>

If an optical scanning apparatus is employed in which a plurality of stations each use a single beam, a color misalignment can be reduced by correcting the inter-station magnification difference. However, for the optical scanning apparatus 8 employing multiple beams, a color misalignment or image moire cannot be reduced unless the inter-beam magnification difference is also reduced.

The multi-beam laser has characteristic values, such as an oscillation wavelength, the amount of light emitted, the sub-scanning interval of scanning lines, and the like. If these characteristic values are not uniform or significantly deviate from the nominal values, the positions or concentration of dots on the transfer sheet S may vary at intervals corresponding to the number of beams. Specifically, image defects occur, such as periodic concentration fluctuation, and moire due to interference of image data with a screen for binarization.

The curvature factor of the photosensitive drum 21 causes a difference in main scanning magnification between scanning lines formed by a plurality of light beams.

Figure 3A:
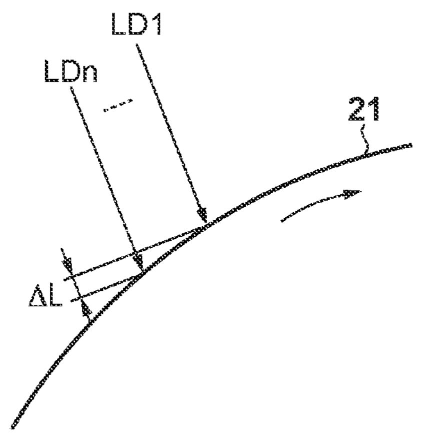
FIGS. 3A, 3B, and 3C are diagrams showing a relationship between irradiation positions of a plurality of light beams, a curvature factor of an image carrier, and magnifications of scanning lines.

FIG. 3A shows how n light beams emitted from the optical scanning apparatus 8 are incident on the photosensitive drum 21. A plurality of scanning lines drawn on the photosensitive drum 21 as an image carrier by the light beams are equally spaced in the sub-scanning direction. The photosensitive drum 21, which is in the shape of a cylinder, has a circular cross-section. The n light beams LD1 to LDn are incident on the photosensitive drum 21 at different positions in the sub-scanning direction. Therefore, the optical paths of the n light beams LD1 to LDn have different lengths due to the influence of the curvature factor. The difference in optical path length between the light beams LD1 and LDn is represented by ΔL.

Figure 3B:
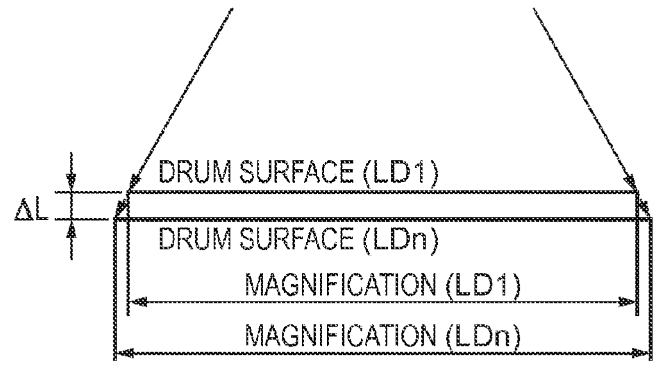

FIG. 3B shows a difference in length between scanning lines drawn on the photosensitive drum 21 by the light beams LD1 and LDn. The scanning line length is substantially synonymous with the main scanning magnification. The light beams LD1 and LDn are transmitted through the same optical system. Therefore, if the optical paths of the light beams LD1 and LDn to the surface of the photosensitive drum 21 have different lengths, the scanning lines of the light beams LD1 and LDn also have different magnifications.

Therefore, for the optical scanning apparatus 8 employing a multi-beam laser, the difference in main scanning magnification between each beam due to the wavelength difference is measured by assembling equipment during assembly in a factory, and the amount of correction of the main scanning magnification for each beam (a scanning width in the main scanning direction for each beam) is calculated. The assembling equipment also adjusts the amount of each light beam and the sub-scanning interval to desired values.

However, an internal temperature of the image forming apparatus 100 increases due to heat dissipated or radiated by motors, a fixing heater, and a power supply during image formation. As a result, the optical scanning apparatus 8 undergoes thermal expansion, and therefore, the irradiation positions of the light beams LD1 to LDn are each misaligned.

Figure 3C:
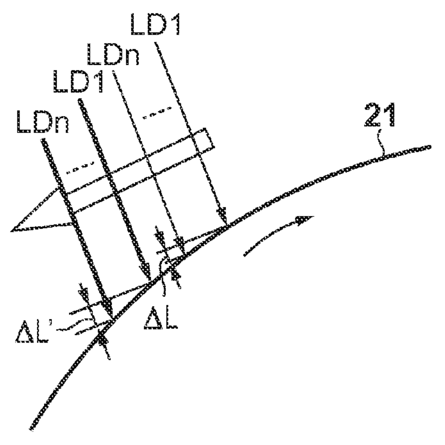

FIG. 3C shows changes in the differences in optical path length between the light beams LD1 to LDn that depend on the incidence position of the photosensitive drum 21. The difference in optical path length, which is ΔL immediately after activation of the image forming apparatus 100, increases to ΔL' as the internal temperature of the image forming apparatus 100 (particularly, an internal temperature of the optical scanning apparatus 8) increases. If the optical path length differences between the light beams LD1 to LDn increase, the magnification differences between the light beams LD1 to LDn also increase. This can also be seen from FIG. 3B.

Figure 4:
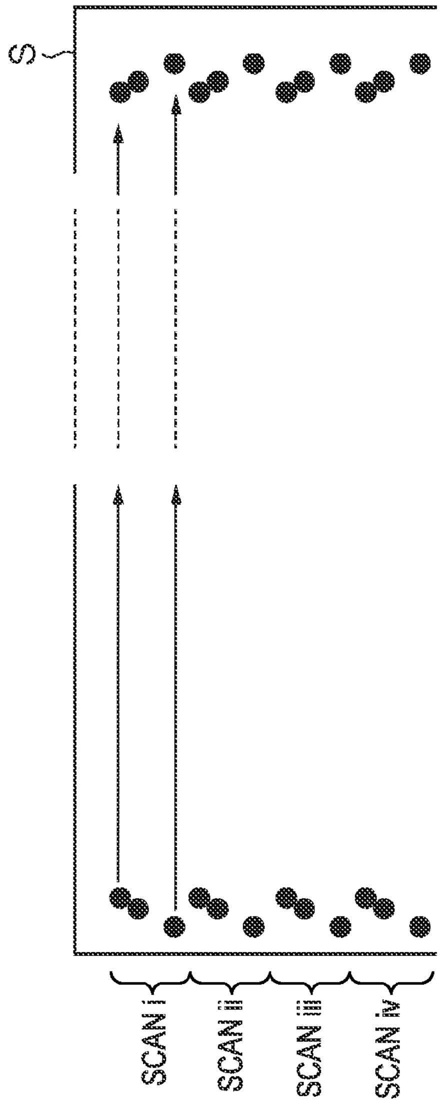
FIG. 4 is a diagram showing periodic misalignments of scanning lines of a plurality of light beams.

FIG. 4 shows periodic position misalignments of scanning lines of the light beams LD1 to LDn. As shown in FIG. 4, the light beams LD1 to LDn are used to perform scanning once, so that n scanning lines are simultaneously drawn. The optical path length differences occur between the light beams LD1 and LDn, depending on the curvature factor of the photosensitive drum 21. Therefore, as one progresses toward an end portion of an image, the dot misalignment increases.

The optical scanning apparatus 8 includes a deflecting mirror (rotating polygonal mirror) that deflects the light beams LD1 to LDn. The n light beams scan on facets of the deflecting mirror. Specifically, an image is formed by successive scans i, ii, iii, . . . , each of which includes a magnification misalignment. If the periodic misalignments interfere with a screen process during an image process, image moire occurs.

When the patterns P1 and P2 for correcting color misalignments are used, only relative magnification differences between the stations are obtained. Therefore, the magnification differences between the light beams LD1 to LDn in the same station cannot be detected with high accuracy. The magnification differences between the light beams LD1 to LDn tend to increase with an increase in temperature. Therefore, in this example, the internal temperature of the optical scanning apparatus 8 is detected, irradiation position misalignments of the light beams LD1 to LDn are estimated based on the internal temperature, and individual correction amounts for the light beams LD1 to LDn are calculated based on the estimated values of the irradiation position misalignments. Note that the correction amounts are determined so that the magnification differences (differences in scanning line length) between the beams become zero.

Figure 5:
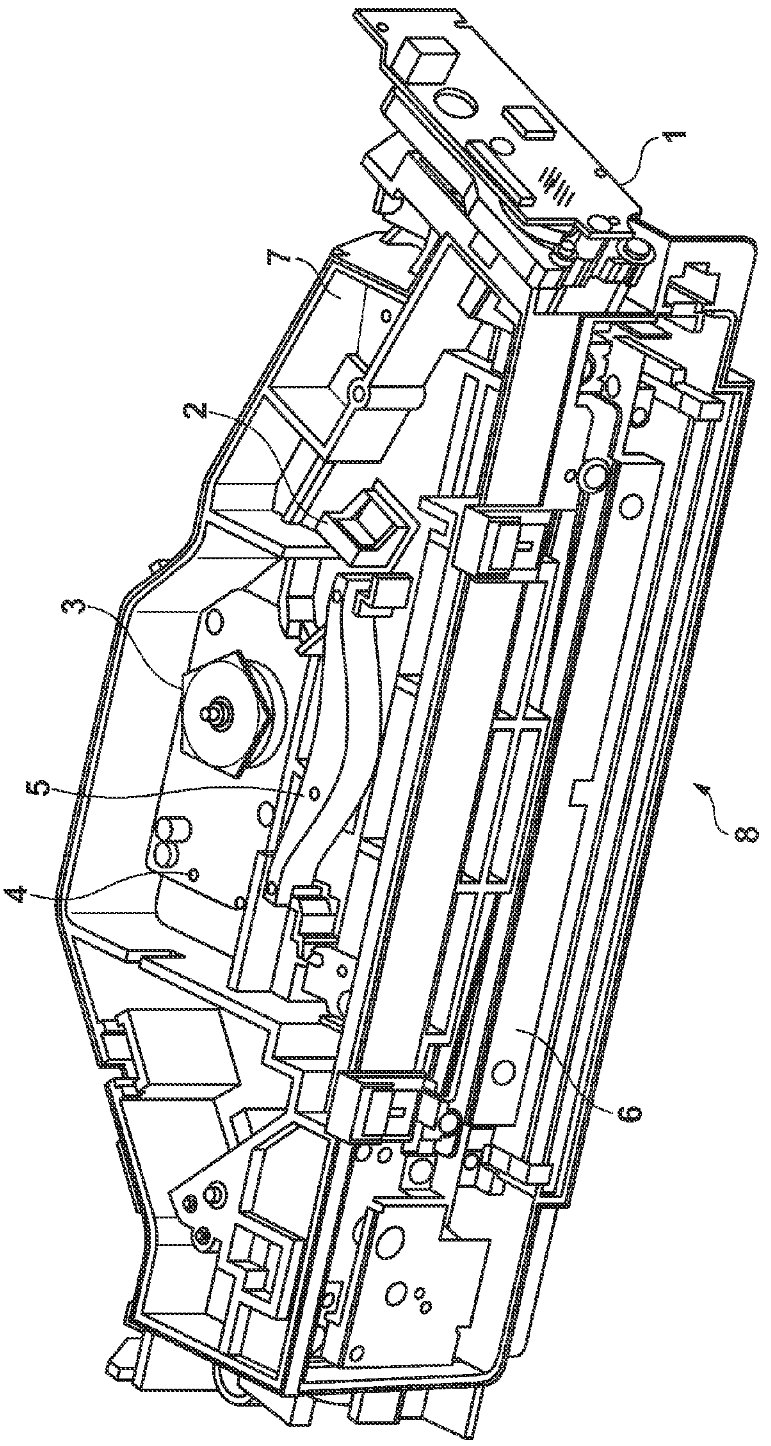
FIG. 5 is a diagram showing a configuration of an optical scanning apparatus.

FIG. 5 shows the optical scanning apparatus 8 of the example. A laser unit 1 includes a semiconductor multi-beam laser that outputs the light beams LD1 to LDn, a driver substrate that drives the semiconductor multi-beam laser, and a collimating lens that collimates the light beams LD1 to LDn. The semiconductor multi-beam laser is an example light source that outputs a plurality of light beams. A multi-beam light source other than the semiconductor multi-beam laser may be used. A cylindrical lens 2 is an optical part that focuses the light beams LD1 to LDn to form lines on a deflecting mirror 3. The deflecting mirror 3 deflects the light beams LD1 to LDn to simultaneously scan the light beams LD1 to LDn on the photosensitive member. The deflecting mirror 3 is mounted in the optical scanning apparatus 8. The deflecting mirror 3 is, for example, a rotating polygonal mirror or a vibrating mirror. A thermistor 4 is a temperature detecting unit that detects the internal temperature of the optical scanning apparatus 8. The thermistor 4 is mounted on a drive substrate that drives a motor for rotating the deflecting mirror 3. A first imaging lens 5 and a second imaging lens 6 are lenses that focus the deflected light beams LD1 to LDn to the photosensitive drum 21. The first and second imaging lenses 5 and 6 are mounted in the optical scanning apparatus 8.

An optical box 7 is a housing that accommodates these parts. The optical axis of the optical system including these optical parts deviates due to an increase in temperature. The light beams LD1 to LDn are transmitted through the same optical system, and therefore, variations in irradiation position in the sub-scanning direction of the light beams LD1 to LDn have the same or uniform relationship. In other words, if a variation in irradiation position of one light beam is known, variations in irradiation position of the other light beams can be estimated based on that variation.

When the image forming apparatus 100 receives a job, heat occurs from heat sources, such as a motor, the fixer 25, other drive units, a power supply, and the like, so that the temperatures of the image forming apparatus 100 and the optical scanning apparatus 8 increase. There are various factors that cause a change in the irradiation position on the photosensitive drum 21 due to the temperature increase. The thermal expansion of the optical scanning apparatus 8 is a particularly significant factor.

Figure 6:
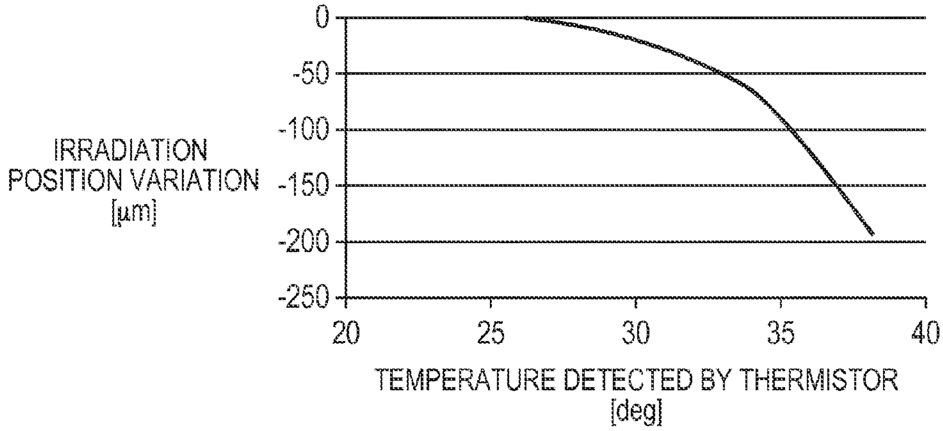
FIG. 6 is a diagram showing a correspondence relationship between temperatures detected by a thermistor and variations in an irradiation position.

FIG. 6 shows a correspondence relationship between the temperature detected by the thermistor 4 and the irradiation position variation. The irradiation position variation is a variation of one (reference light beam) of the light beams that is the closest to the optical axis of the optical system of the optical scanning apparatus 8. The irradiation position variation toward the downstream side in the rotational direction of the photosensitive drum 21 is indicated by a positive sign. As the temperature detected by the thermistor 4 increases, the irradiation position variation increases. On the other hand, as can be seen from FIG. 6, there is a certain correlation between the temperature and the irradiation position variation. Therefore, if the correspondence relationship between the detected temperature and the irradiation position variation is stored as data, a table, a function, or a program in a storage device, the image forming apparatus 100 can obtain the irradiation position variation based on the detected temperature.

Figure 7:
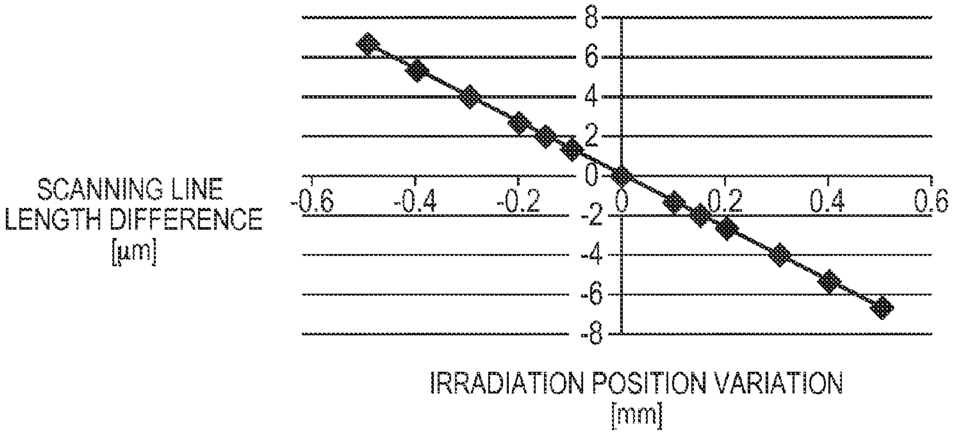
FIG. 7 is a diagram showing a correspondence relationship between variations in an irradiation position at an end portion of an image and differences in length between scanning lines.

FIG. 7 shows a correspondence relationship between the irradiation position variation at an end portion of an image and the scanning line length difference. In the optical scanning apparatus 8, for example, if the irradiation position variation on the photosensitive drum 21 is 100 μm, the scanning line length difference at the image end portion is about 1.3 μm. On the other hand, the increase in the resolution of the image forming apparatus 100 has led to an improvement in the selectivity of the screen. As a result, there has been a demand for the use of a screen that easily causes image moire. In the case of the screen that easily causes image moire, if the scanning line length difference is about 2 μm, image moire occurs.

In contrast, the irradiation position variation on the photosensitive drum 21 is, for example, about 200 μm in the optical scanning apparatus 8. In this case, the scanning line length difference is about 2.6 μm. On the other hand, in the case of other optical scanning apparatuses in which a single rotating polygonal mirror is used to scan light beams of all colors, the irradiation position variation may exceed 300 μm. In this case, the scanning line length difference is about 3.9 μm. Therefore, in both of the cases, image moire occurs.

As can be seen from FIGS. 6 and 7, there is a correlation between the internal temperature of the optical scanning apparatus 8 and the irradiation position variation. Moreover, there is a correlation between the irradiation position variation and the main scanning magnification variation. In other words, there is also a correlation between the internal temperature of the optical scanning apparatus 8 and the main scanning magnification variation. If the main scanning magnification variation is defined by a length, then when the main scanning magnification variation increases, a correction amount equal to the variation may be subtracted from the main scanning magnification. Note that if the main scanning magnification variation is defined by a multiplication coefficient, then when the main scanning magnification variation increases, the main scanning magnification may be multiplied by the reciprocal of the variation. For example, it is assumed that the scanning line has a length of 325 mm, and the length of the scanning line increases by 5 μm. In this case, the correction amount is 0.00154%. Thus, if the main scanning magnification variation is known, the correction amount can be immediately known. Because the reference light beam and the other light beams have the same correspondence relationship, if a reference correction amount is known for the reference light beam, individual correction amounts for the other light beams can be easily calculated. Thus, if the internal temperature of the optical scanning apparatus 8 is known, the individual correction amounts for the light beams can be obtained.

Figure 8:
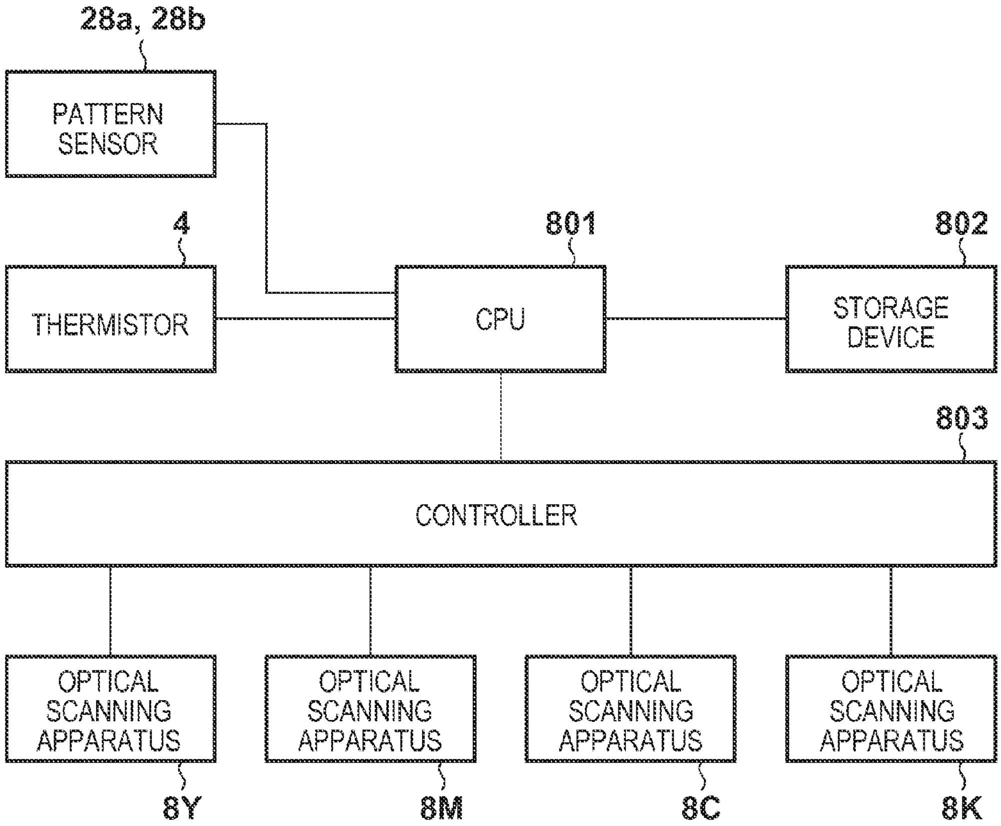
FIG. 8 is a diagram showing a configuration of a control unit.

FIG. 8 is a diagram showing a configuration of the control section. A CPU 801 is a unit that controls correction of a color misalignment caused by the inter-station magnification difference and correction of image moire caused by the inter-beam magnification difference. A storage device 802 stores correction amounts for the inter-station magnification differences of the three stations other than the reference station and individual correction amounts for the inter-station magnification differences of the light beams in the four stations, that are obtained by the CPU 801. The storage device 802 also stores data indicating the correspondence relationship between the internal temperature of the optical scanning apparatus 8 and the irradiation position variation (FIG. 6), and data indicating the correspondence relationship between the irradiation position variation and the main scanning magnification difference (scanning line length difference) (FIG. 7). Note that, instead of these data, a correspondence relationship between the internal temperature and the main scanning magnification difference (scanning line length difference) or a correspondence relationship between the internal temperature and the individual correction amount may be previously obtained and stored in the storage device 802.

As can be seen from FIGS. 6 and 7, the correspondence relationship between the internal temperature and the correction amount is a combination of the correspondence relationship between the internal temperature and the irradiation position variation and the correspondence relationship between the irradiation position variation and the magnification difference (correction amount). Note that these mathematical relationships required to obtain the correction amount is stored as data, a table, a function, or a program in the storage device 802. A controller 803 is a control unit that controls the optical scanning apparatuses 8Y, 8M, 8C, and 8K. In particular, the controller 803 corrects the image clock of the optical scanning apparatus 8 based on a correction amount determined by the CPU 801.

Thus, the controller 803 functions as a correction unit that corrects the magnifications of scanning lines of all or a part of a plurality of light beams using individual correction amounts determined for these light beams.

The controller 803 of FIG. 8 includes a crystal oscillator that generates an image clock signal having a predetermined frequency. The controller 803 generates a drive signal (PWM signal) based on drive data obtained by processing input image data and the image clock signal. A light source included in each optical scanning apparatus, when receiving the drive signal generated by the controller 803, emits a light beam.

Note that the scanning line magnification is corrected by several techniques. Among the correction techniques is modulation of the image clock (a technique of changing the pulse width per dot). Another technique is to correct image data so that a pixel(s) is inserted to or removed from an image to be formed, or a sub-pixel(s) that is obtained by dividing a pixel is inserted to or removed from an image to be formed.

In the image forming apparatus in which the scanning line magnification is corrected by modulation of the image clock, the controller 803 has a function of modulating the frequency of the image clock. The controller 803 modulates the frequency of the image clock output from the crystal oscillator to frequencies corresponding to the respective light emitting elements provided in each optical scanning apparatus, and generates drive signals corresponding to the respective light emitting elements based on drive data corresponding to the respective light emitting elements and the modulated image clock signals. For example, in order to increase the scanning line magnification, the controller 803 reduces the frequency of the image clock output from the crystal oscillator. On the other hand, in order to decrease the magnification of the scanning line, the controller 803 increases the frequency of the image clock output from the crystal oscillator.

In the image forming apparatus in which the scanning line magnification is corrected by correction of image data, the controller 803 has a function of correcting the image data. Specifically, the controller 803 corrects binary drive data including data for enabling emission of a light beam and data for disabling emission of a light beam, and generates a drive signal based on an image clock having a predetermined frequency and the corrected drive data. The drive data corresponds to a pixel(s) or a sub-pixel(s). For example, in order to increase the scanning line magnification, the controller 803 corrects the drive data so that a pixel(s) or a sub-pixel(s) is to be inserted in the main scanning direction. On the other hand, in order to decrease the scanning line magnification, the controller 803 corrects the drive data so that a portion of pixels or sub-pixels is to be removed in the main scanning direction.

<Moire Correction/Inter-Beam Magnification Difference Correction>

Figure 9:
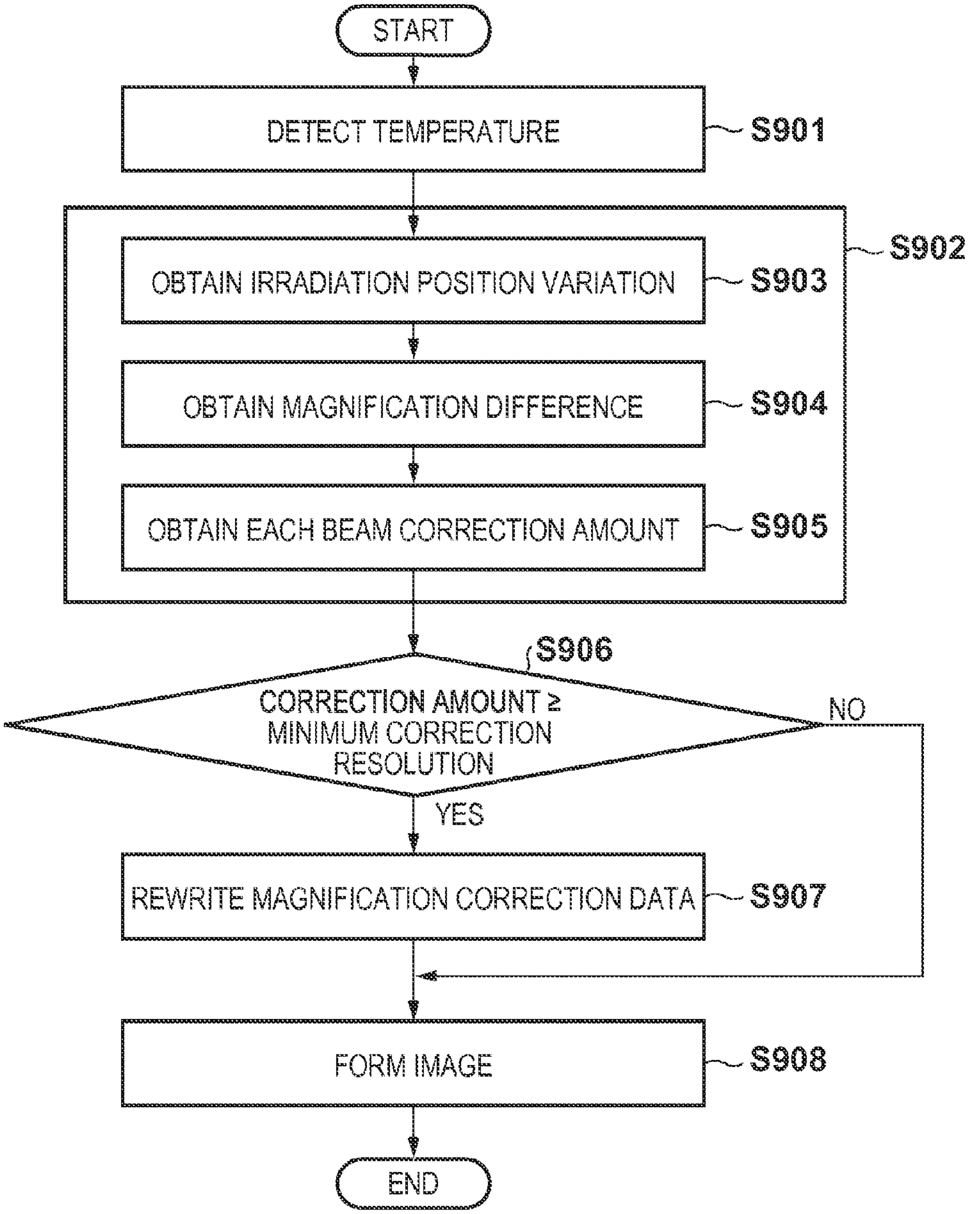
FIG. 9 is a flowchart showing a moire correction control.

FIG. 9 is a flowchart showing a moire correction control. Note that the CPU 801 performs a similar moire correction control in the optical scanning apparatuses 8Y to 8K.

In S901, the CPU 801 performs sampling on output voltage values (temperatures) of the thermistors 4 to obtain the internal temperatures TY, TM, TC, and TK of the optical scanning apparatuses 8Y, 8M, 8C, and 8K.

In S902, the CPU 801 determines correction amounts for the light beams LD1 to LDn in the optical scanning apparatuses 8Y, 8M, 8C, and 8K based on the internal temperatures TY, TM, TC, and TK, respectively. Specifically, the CPU 801 functions as a second determination unit that determines correction amounts that correspond to the internal temperatures detected by the thermistors 4 and depend on the differences in optical path length between all or a part of the light beams due to the curvature factor of the photosensitive drum, using the correspondence relationship between the internal temperature and the correction amount for the magnification of a scanning line drawn with a light beam, which is previously stored in the storage device 802.

Note that the determination unit may include separate units, i.e., a reference correction amount determining unit and an individual correction amount determining unit. In this case, the CPU 801 determines a reference correction amount that is used as a reference for correcting the magnifications of scanning lines drawn with the light beams LD1 to LDn and corresponds to the temperature detected by the thermistor 4, using the correspondence relationship between the temperature and the correction amount, which is previously stored in the storage device 802. The CPU 801 also determines individual correction amounts for correcting scanning line magnifications that are applied to all or a part of the light beams by adjusting the reference correction amount based on the optical path length differences between the light beams due to the curvature factor of the image carrier.

There may be various techniques of determining correction amounts for the light beams LD1 to LDn in the optical scanning apparatus 8Y, 8M, 8C, and 8K based on the internal temperatures TY, TM, TC, and TK of the optical scanning apparatuses 8Y, 8M, 8C, and 8K. For example, S902 may include S903 to S905 described below. If a table, a function, or a program that indicates the correspondence relationship between the internal temperatures TY, TM, TC, and TK and the individual correction amounts for the light beams LD1 to LDn is previously prepared, the CPU 801 can easily obtain the individual correction amounts for the light beams LD1 to LDn. It is hereinafter assumed that the CPU 801 obtains the irradiation position variation of the reference light beam based on the internal temperature, obtains the main scanning magnification difference (reference correction amount) based on the irradiation position variation of the reference light beam, and obtains the individual correction amounts for the other light beams based on the main scanning magnification difference of the reference light beam.

In S903, the CPU 801 obtains irradiation position variations dY, dM, dC, and dK corresponding to the internal temperatures TY, TM, TC, and TK. The storage device 802 previously stores a function, table, data, or program for converting the internal temperature to the irradiation position variation.

In S904, the CPU 801 obtains main scanning magnification differences ΔmY, ΔmM, ΔmC, and ΔmK corresponding to the irradiation position variations dY, dM, dC, and dK. The storage device 802 previously stores a function, table, data, or program for converting the irradiation position variation to the main scanning magnification difference. For example, if the main scanning magnification difference is proportional to the irradiation position variation, the CPU 801 can calculate the main scanning magnification difference by substituting the irradiation position variation in the linear function. Note that if the main scanning magnification differences ΔmY, ΔmM, ΔmC, and ΔmK indicate an increase rate (%) of the main scanning magnification (scanning line length), the CPU 801 can determine the reference correction amounts by simply subtracting the main scanning magnification differences ΔmY, ΔmM, ΔmC, and ΔmK from 100%. In other words, the CPU 801 can calculate a new main scanning magnification by multiplying the currently set main scanning magnification by the correction amount.

Note that the irradiation position variation is expected to vary among the colors. Therefore, the correspondence relationship between the internal temperature and the irradiation position variation may vary among the colors. This is because a temperature distribution in the image forming apparatus 100 is not uniform, or the optical scanning apparatus 8Y to 8K have different running conditions. For example, in a black and white image formation mode, only the optical scanning apparatus 8K is used, and therefore, the temperature of the optical scanning apparatus 8K is more likely to increase than those of the optical scanning apparatus 8Y to 8C. Therefore, the CPU 801 obtains the main scanning magnification difference for each color.

In S904, the CPU 801 calculates correction amounts Y_LD1 to Y_LDn, M_LD1 to M_LDn, C_LD1 to C_LDn, and K_LD1 to K_LDn for correcting the magnifications of the light beams LD1 to LDn, respectively. It is assumed that a function or program for calculating the correction amounts Y_LD1 to Y_LDn, M_LD1 to M_LDn, C_LD1 to C_LDn, and K_LD1 to K_LDn based on the main scanning magnification differences ΔmY, ΔmM, ΔmC, and ΔmK is previously stored in the storage device 802. For example, it is assumed that the correction amounts Y_LD1 to Y_LDn have a linear relationship (a monotonic increase, a monotonic decrease, etc.). In this case, the CPU 801 determines the correction amount Y_LD1 for the reference light beam based on the main scanning magnification difference ΔmY of the reference light beam, and obtains the correction amounts Y_LD2 to Y_LDn for the other light beams based on the correction amount Y_LD1. Because the light beams LD1 to LDn are equally spaced, if the correction amount Y_LD1 is known, the correction amounts Y_LD2 to Y_LDn can be obtained. For example, the CPU 801 may determine an individual correction amount for a light beam of interest, by adding or subtracting a coefficient that is proportional to a distance between the reference light beam and the light beam of interest. This coefficient is obtained based on the curvature factor of the circular cross-section of the photosensitive drum 21, the angle of incidence of the reference light beam, and the irradiation position of the reference light beam. This calculation technique can be similarly applied to the other colors.

In S905, the CPU 801 determines whether or not the correction amounts Y_LD1 to Y_LDn, M_LD1 to M_LDn, C_LD1 to C_LDn, and K_LD1 to K_LDn are greater than or equal to a minimum correction resolution min. When the magnification is corrected by insertion or removal of a dot(s), the correction resolution is one dot in the main scanning direction. In other words, the minimum correction resolution min is a correction amount corresponding to one dot. If the correction amount is smaller than the minimum correction resolution min, the CPU 801 determines that the correction is not allowed (the correction is not required), and control proceeds to S908. On the other hand, if the correction amount is greater than or equal to the minimum correction resolution min, the CPU 801 determines that the correction is allowed, and control proceeds to S906.

In S906, the CPU 801 rewrites the correction amounts Y_LD1 to Y_LDn, M_LD1 to M_LDn, C_LD1 to C_LDn, and K_LD1 to K_LDn for the light beams, which are stored in the storage device 802.

In S907, the CPU 801 outputs, to the controller 803, the correction amounts Y_LD1 to Y_LDn, M_LD1 to M_LDn, C_LD1 to C_LDn, and K_LD1 to K_LDn to perform image formation. The controller 803 corrects the magnifications of the light beams based on the correction amounts Y_LD1 to Y_LDn, M_LD1 to M_LDn, C_LD1 to C_LDn, and K_LD1 to K_LDn, and outputs the corrected magnifications to the optical scanning apparatuses 8Y to 8K.

<Color Misalignment Correction/Inter-Station Magnification Difference Correction>

Incidentally, the main scanning magnification is also corrected in terms of color misalignment. Therefore, the CPU 801 performs color misalignment correction in parallel with the moire correction control.

Figure 10:
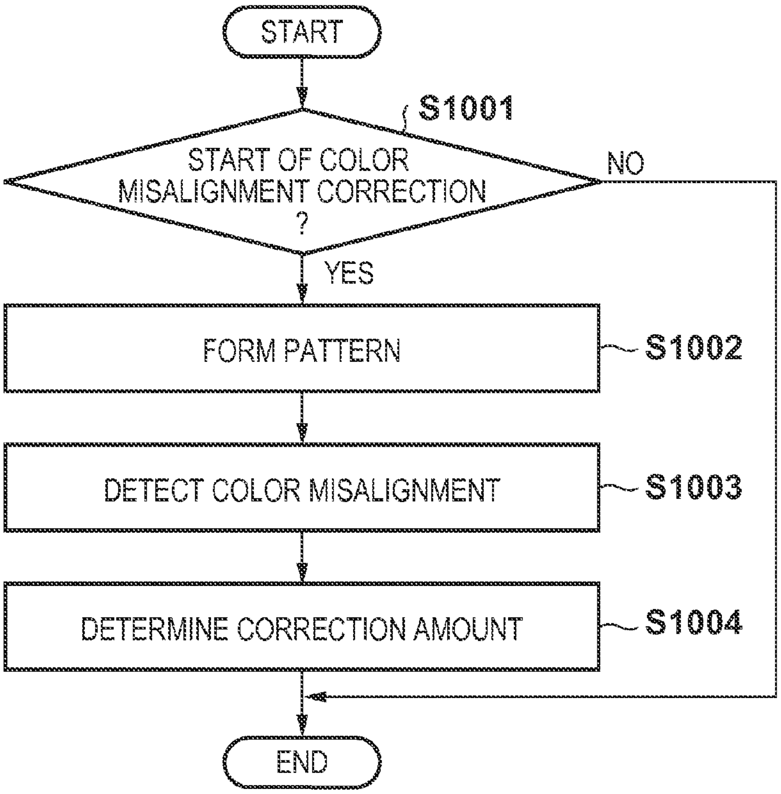
FIG. 10 is a flowchart showing color misalignment correction.

FIG. 10 is a flowchart showing the color misalignment correction. Note that the color misalignment correction itself is already known, and therefore, will here be briefly described.

In S1001, the CPU 801 determines whether or not a condition for start of the color misalignment correction is satisfied. The start condition is, for example, that a variation in the internal temperature detected by the thermistor 4 exceeds a threshold. The internal temperature variation is a difference between the internal temperature (initial value) that is detected immediately after activation of the image forming apparatus 100 and the internal temperature that is subsequently detected. The CPU 801 may count the number of sheets on which images have been formed, and when the count value exceeds a threshold, may determine that the start condition is satisfied. The CPU 801 ends the color misalignment correction if the start condition is not satisfied, and control proceeds to S1002 otherwise. If the start condition is satisfied, the CPU 801 ends or interrupts the current job, and then control proceeds to S1002.

In S1002, the CPU 801 instructs the controller 803 to form the patterns of FIG. 2. The controller 803 outputs an image signal for forming the patterns to the optical scanning apparatuses 8Y to 8K. Each station forms the patterns on the intermediate transfer belt 23 by the above-described process.

In S1003, the CPU 801 reads the patterns using the pattern sensors 28*a* and 28*b*, and obtains the magnitudes of color misalignments in accordance with the procedure described above with reference to FIG. 2. The magnitude of a color misalignment is for a color with respect to the reference color. Therefore, the magnitude of a color misalignment of the reference color is zero. Thus, the pattern sensors 28*a* and 28*b* function as a reading unit that reads the patterns of different colors formed on the intermediate transfer member by each station.

In S1004, the CPU 801 determines correction amounts for magnifications based on the magnitudes of the color misalignments, and rewrites magnification correction data of the colors other than the reference color, which is stored in the storage device 802. Here, basically, the magnification correction data involved in the color misalignment correction varies among Y, M, C, and K and are the same among the light beams LD1 to LDn of the same color. Thus, the CPU 801 functions as a first determination unit that obtains the magnitudes of color misalignments for the magnifications of the colors other than the reference color based on timings at which the patterns of different colors have been read, and determines correction amounts for inter-station magnifications for correcting the color misalignments of the other colors.

Figure 11:
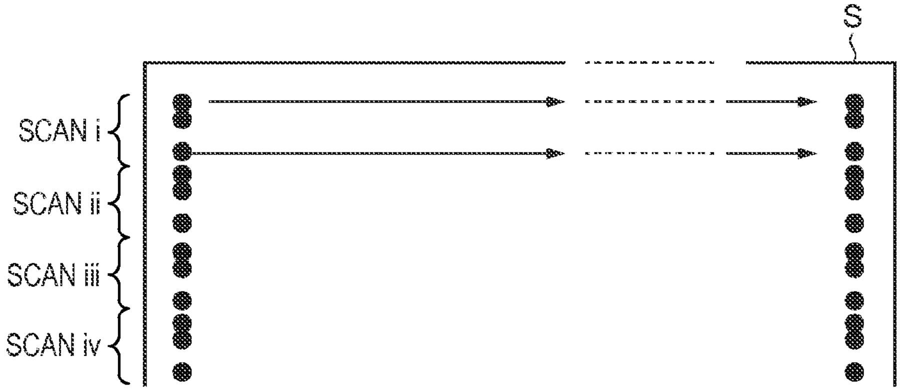
FIG. 11 is a diagram showing scanning lines whose main scanning magnifications are corrected by moire correction.

FIG. 11 is a diagram showing scanning lines whose main scanning magnifications have been corrected by the moire correction. As shown in FIG. 11, scanning lines drawn with the light beams LD1 to LDn have the same length. Even when scanning is repeatedly performed, the scanning lines drawn with the light beams LD1 to LDn have the same length, and therefore, image moire does not occur.

In this example, the CPU 801 obtains a correction amount for an image clock that corresponds to the internal temperature of the optical scanning apparatus 8 and depends on a difference in optical path length caused by the curvature factor of the photosensitive drum 21, to correct the magnifications (scanning line lengths) of all or a part of the light beams. As a result, even in the optical scanning apparatus 8 in which a plurality of light beams are simultaneously scanned, an image with less moire can be produced. There are several techniques of obtaining a correction amount for an image clock based on the internal temperature. The irradiation position variation that induces moire depends on the internal temperature of the image forming apparatus 100. Therefore, if the internal temperature and the correction amount for the magnification of a light beam of interest are previously obtained by an experiment or simulation, the CPU 801 can easily determine the correction amount.

In this example, the CPU 801 may determine a correction amount (reference correction amount) common to a plurality of light beams based on the internal temperature, and may determine an individual correction amount for a target to be corrected, based on the common correction amount. In this case, the CPU 801 can determine the individual correction amount by adjusting the reference correction amount based on the difference in optical path length caused by the curvature factor of the photosensitive drum 21. The magnification difference between a plurality of light beams in the same station is predominantly determined by the difference in optical path length caused by the curvature factor. Therefore, by obtaining the individual correction amount based on the curvature factor, moire can be reduced.

Note that the CPU 801 may calculate the irradiation position variation based on the internal temperature, obtain the magnification difference based on the irradiation position variation, and obtain the correction amount based on the magnification difference. The magnification difference between a plurality of light beams in the same station significantly depends on the irradiation position variation. If the irradiation position variation in the sub-scanning direction is known, the magnification difference can be easily obtained.

A plurality of scanning lines drawn with a plurality of light beams are equally spaced in the sub-scanning direction. Therefore, the CPU 801 can determine an individual correction amount for a light beam of interest by adding or subtracting a coefficient that is proportional to the distance between the reference light beam and the light beam of interest. In other words, when the magnification differences of light beams other than the reference light beam monotonically increase or decrease with respect to the magnification difference of the reference light beam, this calculation technique can be used. The coefficient is obtained based on the curvature factor of the circular cross-section of the photosensitive drum 21, the angle of incidence of the reference light beam, and the irradiation position of the reference light beam. While the irradiation position variation in the sub-scanning direction depends on the temperature, the curvature factor and the angle of incidence and the like are constant parameters previously designed. Therefore, it is advantageous that the CPU 801 can unambiguously calculate the correction amounts based on these information items.

The image forming apparatus 100 that forms a multi-color image is a tandem image forming apparatus that includes a plurality of stations. Therefore, a difference in magnification between each station causes a color misalignment. The color misalignment may be corrected by several techniques. For example, patterns of different colors formed on the intermediate transfer belt 23 by the stations are read by the pattern sensors 28*a* and 28*b*. The CPU 801 functions as a magnification correction amount determining unit that obtains the magnitudes of color misalignments related to the magnifications of colors other than the reference color with respect to the reference color based on timings at which the patterns of different colors are read, to determine correction amounts for the magnifications for correcting the color misalignments of the colors other than the reference color. As a result, in this example, the color misalignments can be corrected. Moreover, the magnifications of the beams in the same station are corrected as described above, whereby moire can also be reduced. In other words, in this example, provided is a multi-color image forming apparatus in which not only color misalignments but also moire can be reduced.

<Variations>

The individual correction amounts for the light beams LD1 to LDn may not necessarily be different from each other. For example, when the minimum correction resolution has some values, the image clock may be corrected by the same correction amount for all the light beams LD1 to LDn. In this case, the CPU 801 determines correction amounts for the magnifications of scanning lines of a series of light beams successively arranged in the sub-scanning direction, of the light beams, so that the correction amounts have the same value. Not all the light beams LD1 to LDn always need to be corrected. If the relative magnification differences between the light beams LD1 to LDn are reduced, moire decreases, and therefore, the image clock may be corrected for only a part of the light beams.

The process of reducing image moire shown in FIG. 9 may be performed for the colors individually. For example, when correction amounts greater than or equal to the correction resolution are calculated for only a part of the colors, the CPU 801 may perform the magnification correction for only the specific colors. The CPU 801 may update the magnification correction data within a range that does not cause moire simultaneously with the other colors.

Here, the CPU 801 performs the moire correction on (n−1) light beams of the light beams LD1 to LDn, and performs the inter-station color misalignment correction on the remaining one of the light beams by setting a temperature-dependent component of the individual correction amount to zero. As a result, a mutual influence between the color misalignment correction and the moire correction can be reduced.

This will be described in detail. After the inter-station magnification is corrected by the color misalignment correction process, the CPU 801 corrects the inter-beam magnification based on the internal temperature for the moire correction. In this case, if the magnification differences of all the light beams are corrected, new magnification differences between the colors occur, depending on the correction amount. Therefore, in order to achieve both the moire correction and the color misalignment correction at a satisfactory level, the CPU 801 designates, as the reference light beam, a light beam closest to the lens optical axis of the optical scanning apparatus 8 (a middle one of the light beams), and corrects the magnification difference for the moire correction using the other light beams. Although there are differences in magnification between the light beams due to the curvature factor of the photosensitive drum 21, the average magnification of the light beams is substantially equal to the magnification of a middle light beam. When patterns are formed in the color misalignment correction, patches are formed using all of the light beams. Therefore, the magnification obtained as a result of detection using the pattern sensors 28*a* and 28*b* is substantially equal to the average magnification. A typical multi-beam semiconductor laser has an even number of beams. Specifically, there are two light beams that are the closest to the optical axis of the optical system. Therefore, either of the two light beams may be used as the reference light beam. The magnification of the reference light beam is corrected by the correction amount for reducing the inter-station color misalignment, and is not corrected based on the temperature-dependent correction amount for the image moire correction.

Although, here, the thermistor 4 is provided on the drive substrate, this is only by way of example. For example, another substrate on which the thermistor 4 is mounted may be provided in the optical scanning apparatus 8 as long as the internal temperature of the optical scanning apparatus 8 can be detected. Moreover, it is not essential that the thermistor 4 is provided inside the optical scanning apparatus 8. The thermistor 4 may be provided at a place where the internal temperature of the image forming apparatus 100 can be detected. For example, the thermistor 4 may be provided outside the optical scanning apparatus 8 (e.g., on a drive circuit substrate that drives the semiconductor laser, etc.) as long as the thermistor 4 is located inside the image forming apparatus 100.

<Technique of Obtaining Correction Amount for Reference Light Beam>

A technique of obtaining a correction amount for a reference light beam will be described with reference to FIGS. 12A and 12B.

Figure 12A:
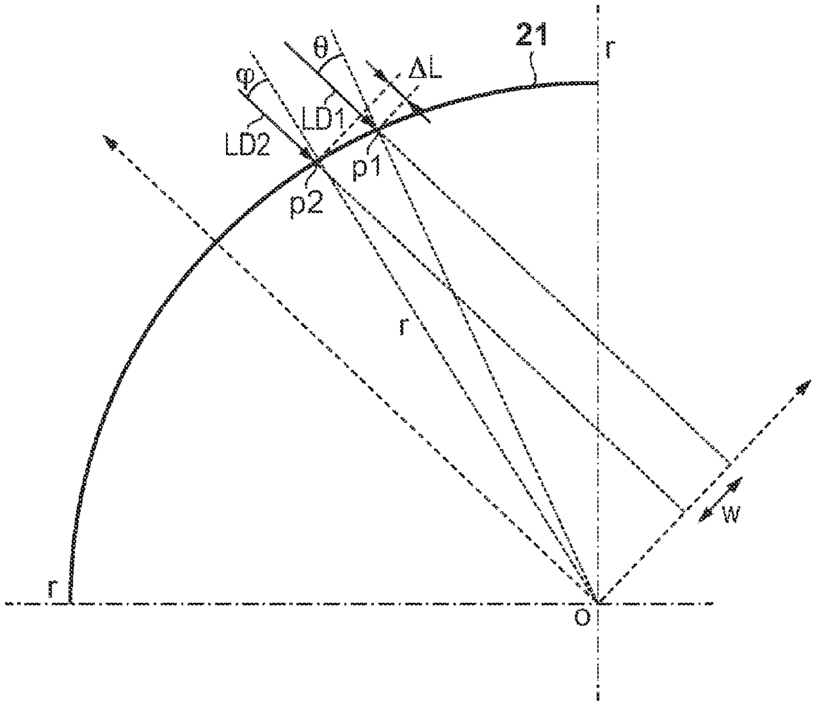
FIGS. 12A and 12B are diagrams for describing a technique of obtaining a difference in magnification between scanning lines.

FIG. 12A shows a cross-section of the photosensitive drum 21. The origin "O" indicates the center of the rotating shaft of the photosensitive drum 21. The reference character LD1 indicates a reference light beam, and the reference character LD2 indicates a light beam adjacent to the reference light beam. The reference character r indicates the radius of the photosensitive drum 21. The reference character W indicates the distance (beam interval) between the reference light beam LD1 and the adjacent light beam LD2. The reference character p1 indicates the irradiation position of the reference light beam LD1 on the photosensitive drum 21. The reference character p2 indicates the irradiation position of the adjacent light beam LD2 on the photosensitive drum 21. The reference character θ indicates the angle (the angle of incidence in the sub-scanning direction) between a straight line passing through the origin O and the irradiation position p1 and the reference light beam LD1. The reference character ϕ indicates the angle (the angle of incidence in the sub-scanning direction) between a straight line passing through the origin O and the irradiation position p2 and the adjacent light beam LD2. The reference character ΔL indicates the difference between the optical path lengths of the reference light beam LD1 and the adjacent light beam LD2. ΔL can be calculated by:

$$\Delta L = r\cos\phi - r\cos\theta$$

Next, the difference in length between the scanning lines in the main scanning direction is obtained based on ΔL. FIG. 12B shows the difference between the length m1 of the scanning line drawn with the reference light beam LD1 and the length m2 of the scanning line drawn with the adjacent light beam LD2. The light beams LD1 to LDn are deflected by the deflecting mirror, and therefore, the angle of incidence in the main scanning direction varies depending on the image height. The image height refers to a distance from the center (optical axis) of the scanning line in the main scanning direction.

Figure 12B:
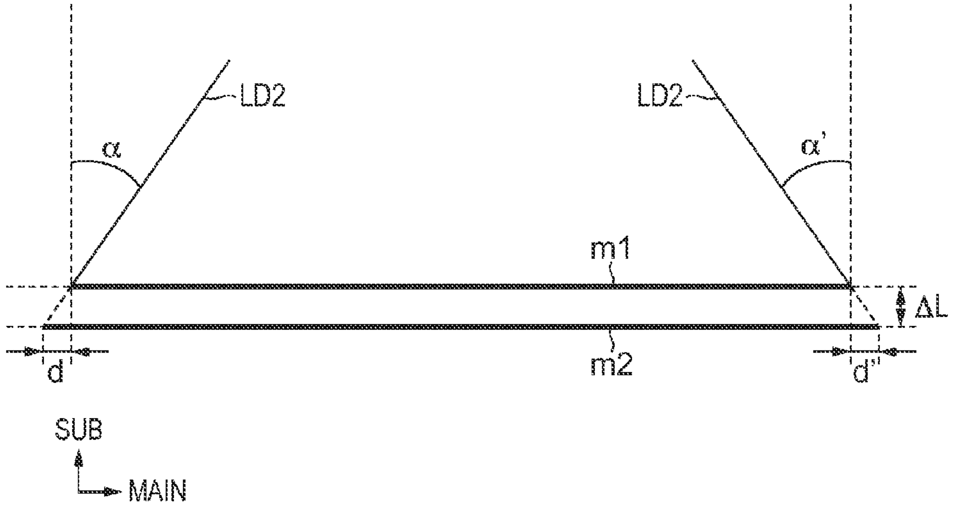

In FIG. 12B, the reference character α indicates the angle of incidence of the adjacent light beam LD2 at the left end of the scanning line. The reference character α' indicates the angle of incidence of the adjacent light beam LD2 at the right end of the scanning line. The angles α and α' are a scan angle that is common to all of the light beams LD1 to LDn including the reference light beam LD1. Typically, α=α'. Here, the magnitude (d) of a misalignment at the left end of the scanning line and the magnitude (d') of a misalignment at the right end of the scanning line are represented by:

$$d = \Delta L \sin\alpha$$

$$d' = \Delta L \sin\alpha'$$

Therefore, a difference x between the length m1 of the scanning line drawn with the reference light beam LD1 and the length m2 of the scanning line drawn with the adjacent light beam LD2 is represented by:

$$\begin{aligned} x &= m2 - m1 \\ &= d + d' \\ &= \Delta L\sin\alpha + \Delta L\sin\alpha' \\ &= (r\cos\varphi - r\cos\theta)(\sin\alpha + \sin\alpha') \end{aligned}$$

Note that the change rate y of the scanning lines is represented by:

$$\begin{aligned} y &= m2/m1 \\ &= (m1 + d + d')/m1 \\ &= 1 + (d + d')/m1 \end{aligned}$$

where r, α, and α' are designed numerical values and known. The irradiation position of the reference light beam LD1 can be estimated based on the internal temperature as described above, and therefore, θ can be obtained. The light beams LD1 to LDn are spaced at equal beam intervals (W). Therefore, if the irradiation position p1 can be estimated, the irradiation position p2 is known, and ϕ is eventually obtained. Because m1 is the length of the scanning line of the reference light beam LD1, m1 can be estimated based on the internal temperature. Note that this theory is applicable to the other light beams in addition to the adjacent light beam LD2. This is because, as shown in FIG. 4, the length of a scanning line of a light beam monotonically increases or decreases with a coefficient of proportionality of (d+d'). Therefore, the CPU 801 can obtain an individual correction amount for a light beam of interest by adding or subtracting a coefficient that is proportional to the distance between the reference light beam and the light beam of interest (a multiple of the beam interval).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-100349, filed Apr. 25, 2012 and 2013-077264, filed Apr. 2, 2013, which are hereby incorporated by reference herein in their entirety.

What is claimed is:

1. An image forming apparatus comprising an optical scanning apparatus and a correction unit, the optical scanning apparatus including:

a light source including a plurality of light emitting elements each configured to output, based on input image data, a light beam for irradiation of a photosensitive member driven to rotate, wherein the plurality of light emitting elements are arranged so that the photosensitive member is irradiated at different positions in a rotational direction with a plurality of the light beams output from the plurality of light emitting elements, a deflection unit provided in the optical scanning apparatus and configured to deflect the plurality of light beams output from the plurality of light emitting elements so that the plurality of light beams scan on the photosensitive member, a lens provided in the optical scanning apparatus and configured to guide the plurality of light beams deflected by the deflection unit to the photosensitive member, and a temperature detecting unit configured to detect an internal temperature of the optical scanning apparatus;

the correction unit being configured to correct a scanning width of at least one of the plurality of light beams emitted from the plurality of light emitting elements based on the input image data, based on a result of the detection by the temperature detecting unit, so that the plurality of light beams output from the plurality of light emitting elements based on the input image data have the same scanning width in a scanning direction in which the plurality of light beams scan on the photosensitive member.

2. The image forming apparatus according to claim 1, wherein the correction unit includes a controller configured to generate drive data based on the input image data, and based on the drive data, cause the plurality of light emitting elements to emit the light beams, wherein the controller corrects the drive data based on the result of the detection by the temperature detecting unit to correct the scanning width.

3. The image forming apparatus according to claim 1, wherein the correction unit includes a controller configured to generate clock signals each having a frequency corresponding to a corresponding one of the plurality of light emitting elements, generate drive data based on the input image data, and based on the clock signals and the drive data, cause the plurality of light emitting elements to emit the light beams, wherein the controller generates the clock signals each having a frequency corresponding to a corresponding one of the plurality of light emitting elements based on the result of the detection by the temperature detecting unit.

4. The image forming apparatus according to claim 1, further comprising:

a determination unit configured to determine, based on a previously obtained correspondence relationship between the temperatures and correction amounts for the scanning widths of the light beams, a correction amount that corresponds to the temperature detected by the temperature detecting unit and depends on a difference in optical path length between all or a part of the plurality of light beams due to a curvature factor of the photosensitive member in the rotational direction of the photosensitive member, wherein the correction unit corrects the scanning width based on the correction amount determined by the determination unit.

5. The image forming apparatus according to claim 4, wherein the determination unit includes a reference correction amount determining unit configured to determine, based on the previously obtained correspondence relationship between the temperatures and the correction amounts, a reference correction amount that is a reference for correcting the scanning widths of the plurality of light beams and corresponds to the temperature detected by the temperature detecting unit, and an individual correction amount determining unit configured to determine an individual correction amount for the scanning width applied to each of all or a part of the plurality of light beams by adjusting the reference correction amount based on the difference in optical path length between the plurality of light beams due to the curvature factor of the photosensitive member.

6. The image forming apparatus according to claim 5, wherein the reference correction amount determining unit obtains a variation in the irradiation position corresponding to the temperature detected by the temperature detecting unit based on a previously obtained correspondence relationship between the temperatures and variations in the irradiation positions of the light beams, obtains the scanning width difference corresponding to the temperature detected by the temperature detecting unit based on a previously obtained correspondence relationship between variations in the irradiation positions of the light beams and scanning width differences that are variations in the scanning widths, and determines the reference correction amount based on the scanning width difference, and wherein the previously obtained correspondence relationship between the temperatures and the correction amounts is a relationship that is a combination of the previously obtained correspondence relationship between the temperatures and variations in the irradiation positions and the previously obtained correspondence relationship between variations in the irradiation positions and the scanning width differences.

7. The image forming apparatus according to claim 4, wherein the determination unit determines a correction amount for the scanning width of each of a series of light beams successively arranged in the rotational direction of the photosensitive member, of the plurality of light beams, so that the correction amounts are the same.

8. The image forming apparatus according to claim 4, wherein a light beam whose scanning width of a scanning line is not corrected in dependence upon on the temperature is a middle one of the plurality of light beams.

9. An image forming apparatus including a plurality of stations configured to form images of different colors on an intermediate transfer member, the apparatus comprising:

a reading unit configured to read patterns of different colors formed on the intermediate transfer member by the plurality of stations;

a first determination unit configured to obtain a magnitude of a color misalignment in a scanning width of a color other than a reference color with respect to the reference color based on timings at which the patterns of different colors are read, and determine a correction amount for an inter-station scanning width difference for correcting the color misalignment of the color other than the reference color; and an optical scanning apparatus provided in each of the plurality of stations and configured to scan a plurality of light beams, wherein the optical scanning apparatus includes a light source including a plurality of light emitting elements each configured to output, based on input image data, a light beam for irradiation of a photosensitive member driven to rotate, wherein the plurality of light emitting elements are arranged so that the photosensitive member is irradiated at different positions in a rotational direction with a plurality of the light beams output from the plurality of light emitting elements, a deflection unit provided in the optical scanning apparatus and configured to deflect the plurality of light beams output from the plurality of light emitting elements so that the plurality of light beams scan on the photosensitive member, a lens provided in the optical scanning apparatus and configured to guide the plurality of light beams deflected by the deflection unit to the photosensitive member, a temperature detecting unit configured to detect an internal temperature of the optical scanning apparatus, and a second determination unit configured to determine a correction amount for an inter-beam scanning width difference, based on a previously obtained correspondence relationship between the temperatures and correction amounts for scanning widths of scanning lines, the correction amount for an inter-beam scanning width difference corresponding to the temperature detected by the temperature detecting unit and depending on a difference in optical path length between the plurality of light beams due to a curvature factor of the photosensitive member, and the image forming apparatus further includes a correction unit configured to correct a scanning width of at least one of the plurality of light beams emitted from the plurality of light emitting elements based on the input image data, based on a result of the detection by the temperature detecting unit, so that the plurality of light beams emitted from the plurality of light emitting elements based on the input image data have the same scanning width in a scanning direction in which the plurality of light beams scan on the photosensitive member, wherein the correction unit corrects the scanning width of a middle one of the plurality of light beams based on the correction amount determined by the first determination unit, and for the plurality of light beams other than the middle one, corrects the scanning widths thereof based on the correction amount determined by the first determination unit and thereafter corrects the scanning widths based on the correction amount determined by the second determination unit.

10. The image forming apparatus according to claim 9, wherein the correction unit includes a controller configured to generate drive data based on the input image data, and based on the drive data, cause the plurality of light emitting elements to emit the light beams, wherein the controller corrects the drive data based on the result of the detection by the temperature detecting unit to correct the scanning width.

11. The image forming apparatus according to claim 9, wherein the correction unit includes a controller configured to generate clock signals each having a frequency corresponding to a corresponding one of the plurality of light emitting elements, generate drive data based on the input image data, and based on the clock signals and the drive data, cause the plurality of light emitting elements to emit the light beams, wherein the controller generates the clock signals each having a frequency corresponding to a corresponding one of the plurality of light emitting elements based on the result of the detection by the temperature detecting unit.

12. The image forming apparatus according to claim 9, wherein the second determination unit includes a reference correction amount determining unit configured to determine, based on the previously obtained correspondence relationship between the temperatures and the correction amounts, a reference correction amount that is a reference for correcting the scanning widths of the plurality of light beams and corresponds to the temperature detected by the temperature detecting unit, and an individual correction amount determining unit configured to determine an individual correction amount for the scanning width of a scanning line applied to each of all or a part of the plurality of light beams by adjusting the reference correction amount based on the difference in optical path length between the plurality of light beams due to the curvature factor of the photosensitive member.

13. The image forming apparatus according to claim 12, wherein the reference correction amount determining unit obtains a variation in the irradiation position corresponding to the temperature detected by the temperature detecting unit based on a previously obtained correspondence relationship between the temperatures and variations in the irradiation positions of the light beams, obtains the scanning width difference corresponding to the temperature detected by the temperature detecting unit based on a previously obtained correspondence relationship between variations in the irradiation positions of the light beams and scanning width differences that are variations in the scanning widths of the scanning lines, and determines the reference correction amount based on the scanning width difference, wherein the previously obtained correspondence relationship between the temperatures and the correction amounts is a relationship that is a combination of the previously obtained correspondence relationship between the temperatures and variations in the irradiation positions and the previously obtained correspondence relationship between variations in the irradiation positions and the scanning width differences.

14. The image forming apparatus according to claim 9, wherein the second determination unit determines a correction amount for the scanning width of each of a series of light beams successively arranged in the rotational direction of the photosensitive member, of the plurality of light beams, so that the correction amounts are the same.

15. The image forming apparatus according to claim 9, wherein a light beam whose scanning width of a scanning line is not corrected in dependence upon on the temperature is a middle one of the plurality of light beams.

16. The image forming apparatus according to claim 15, wherein the scanning width of the scanning line of the middle light beam is corrected based on a correction amount for reducing a color misalignment between a plurality of optical scanning apparatuses including the optical scanning apparatus, and for the light beams other than the middle one of the plurality of light beams, the scanning width is corrected based on the correction amount for reducing the color misalignment between the plurality of optical scanning apparatuses, and thereafter, is corrected based on the correction amount depending on the temperature.

17. The image forming apparatus according to claim 9, wherein a light beam whose scanning width of a scanning line is not corrected in dependence upon on the temperature is a light beam located closest to an optical axis of the optical scanning apparatus.

* * * * *